Aug. 12, 1924.

G. C. ADAMS

BRICK MACHINE

Filed June 13, 1922 6 Sheets-Sheet 4

Inventor,
George C. Adams
By _______ Atty.

Patented Aug. 12, 1924.

1,504,302

UNITED STATES PATENT OFFICE.

GEORGE C. ADAMS, OF MECHANICVILLE, NEW YORK, ASSIGNOR OF ONE-FOURTH TO JOSEPH M. PURCELL AND ONE-FOURTH TO RICHARD A. MOORE, BOTH OF MECHANICVILLE, NEW YORK.

BRICK MACHINE.

Application filed June 13, 1922. Serial No. 567,944.

*To all whom it may concern:*

Be it known that I, GEORGE C. ADAMS, a citizen of the United States, residing at Mechanicville, in the county of Saratoga and State of New York, have invented certain new and useful Improvements in Brick Machines, of which the following is a specification.

This invention relates to brick machines having means for rapping or jarring the molds and for emptying them of the molded bricks.

The objects of the invention are to provide, first, improved means for moving the molds away from the press after the bricks have been molded; second, improved means for supporting the mold table so that surplus clay will be removed from the surface of the molded brick; third, novel means for striking or jarring the molds for the purpose of compressing the clay to reduce its volume and enable the molded brick to easily "draw" from the molds; fourth, novel means for handling the molds after they have been rapped or struck.

The novel means for handling the molds after they have been rapped or struck may assume different constructions. The simplest means used for that purpose shifts the molds with the molded brick therein, to a convenient point where attendants may invert the molds and lower away the molded brick therefrom and then deliver the molds to any suitable sanding apparatus.

The preferred embodiments of the means for taking away the molds filled with the molded brick are, however, of an entirely automatic nature and provide for the automatic inversion of the molds, the lowering away of the pallets and molded brick from the molds, the automatic delivery of the pallets and the molded brick carried thereby, and the automatic turning of the empty molds to upright position and their delivery either to a sander, as in one embodiment of the invention, or, to the brick press, as in another embodiment of the invention hereinafter described.

The foregoing objects are accomplished by the provision of novel means of which certain embodiments are hereinafter described and shown in the accompanying drawings. It is to be understood, however, that the principles of my invention involved in the different means hereinbefore referred to, may be successfully carried out in other embodiments of mechanism which are not illustrated or specifically described and the disclosure is, therefore, to be considered as illustrative, instead of restrictive, of the scope of the invention.

In the accompanying drawings:

Fig. 7 is another modified filled mold delivery mechanism which may be used instead of the delivery mechanism of Fig. 5.

Figure 1:
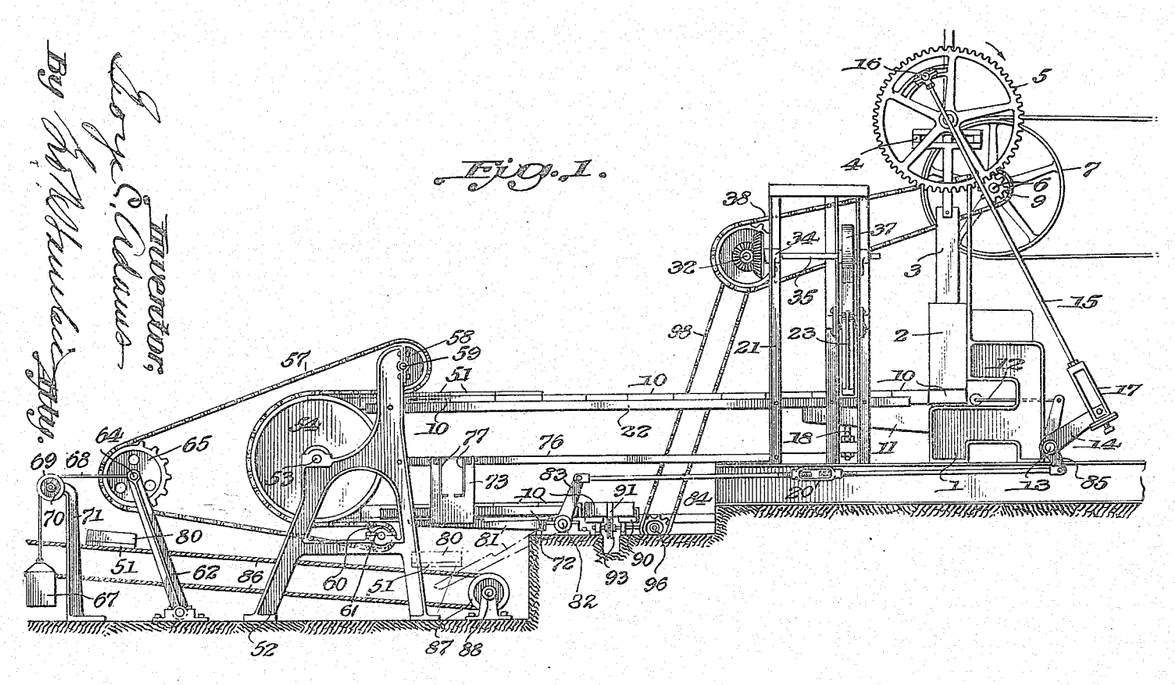
Figure 1 is a side elevation of a brick machine embodying the different mechanisms of my invention.
Figure 2:
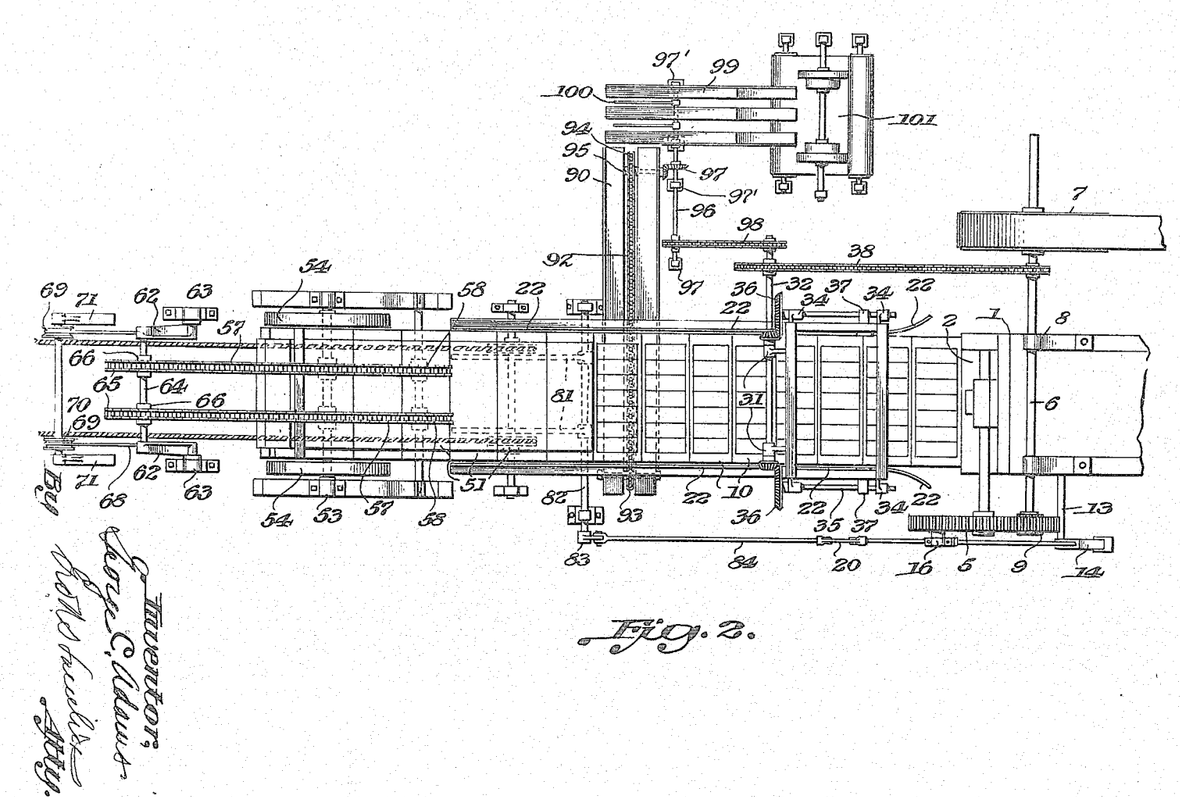
Fig. 2 is a plan view thereof.

Referring first to Figs. 1 and 2, there is illustrated a brick press 1 of any well known or approved construction having a box 2 for the clay and provided with a plunger 3 which is operated through the medium of cross head 4 from gear 5 suitably mounted in the framework of the press.

The counter-shaft 6 which is suitably driven by a belt and pulley 7 and journaled at 8, carries a pinion 9 meshing with the gear 5 by which the plunger 3 is suitably reciprocated and timed to force the clay from the box 2 into a mold 10 which is supported on the bed or table 11 of the brick press 1.

To eject or force out the mold 10 from underneath the box 2 after the mold has been filled, there is provided an ejector or pusher 12 which is carried by a rock shaft 13, said rock shaft having an arm 14 which is intermittently operated by a connecting rod 15 having an adjustable wrist pin connection 16 to the gear 5 and a lost motion yoke connection 17 to said arm 14.

The brick press just described is of well known construction and no claim is laid thereto.

In brick presses of the type described, employing a table 11, the tendency of the table is to tilt which results in unevenness and surplus clay on the molded brick. To overcome this defect, I provide adjustable jack screws 18 clamped by nuts 19 located above and below a cross piece 20 of the frame 21 which support the striking or jarring mechanism shown in Fig. 3. These jack screws bear against the under side of the table 11 and prevent it from tilting as they hold the table level and in fixed position for the removal of the surplus clay from the surface of the molded brick.

The mold 10 having been filled and containing molded brick is pushed, with a step by step motion, by the action of pusher 12, and followed by other filled molds, until it comes in line with the jarring or striking mechanism shown in detail in Fig. 3 and, while still resting on the table 11, the mold is struck or jarred to cause the molded brick to become denser and to more easily free themselves from the walls of the mold so that they can, later on, be readily drawn from the mold. Horizontal guides 22 cause the molds 10 to travel in proper alinement and in contact, one ahead of the other.

The striking or jarring mechanism has hammer levers 23 which are pivoted to frame 21 at 24, their heads 25 being so located that they will be adapted to strike the sides of the mold 10. Adjustable spring-actuated bumpers 26 carried by the frame 21 are so arranged that they will be engaged by the hammers 23 and will cushion the blows of the latter and also insure that the heads 25 of the hammers will be out of engagement with the mold after the mold has been struck so that the mold may be pushed forward to allow a succeeding mold to come in line with the hammers. The heads 25 may be adjusted, if desired, to regulate the strength of the blow for delivery and the bumpers 26 may be adjusted to absorb any part of the blows of the hammers.

Contractile coil springs 27 are connected to the upper ends of the hammers 23 and to pivoted levers 28 which may be secured to a sector 29 at any desired points thereof by means of suitable pins or bolts 30. By adjusting the levers 28, any desired tension may be put upon the springs 27 so as to dispose the heads 25 at any desired distance from the mold 10.

Journaled in suitable bearings 31 carried by frame 21 is a shaft 32 which carries pinions 33. Journaled in other bearings 34 are shafts 35 which are provided with gears 36 which mesh with the pinions 33 and are driven by said pinions.

Carried by the shafts 35 are wiper cams 37 which, during each revolution of the shafts 35, wipe against and eventually release, the upper ends of the hammers 23 thus retracting the hammers and finally freeing them whereupon they drop by gravity and deliver blows against opposite sides of the mold 10, such blows being cushioned by the bumpers 26 and the stretching of the springs 27. The springs 27 cause the hammers to rebound to the position shown in Fig. 3, after they have delivered their blows. Preferably, the cams 37 will be so set in relation to each other that the hammers 23 will be alternately operated.

The shaft 32 is driven by chain and sprocket gearing 38 from the shaft 6.

Figure 6:
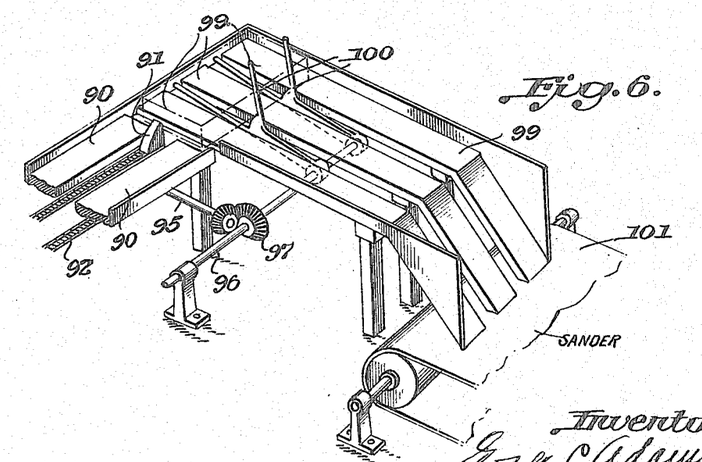
Fig. 6 is a detail perspective of the delivery and turn-over mechanism of Figs. 1 and 2 for delivering the empty molds to a sander.

After the molds have been struck or rapped, they are preferably handled by automatic means such as shown in Figs. 1, 2, 4 and 9, and by the mechanism shown in Fig. 6, all of which will be presently described.

Figure 5:
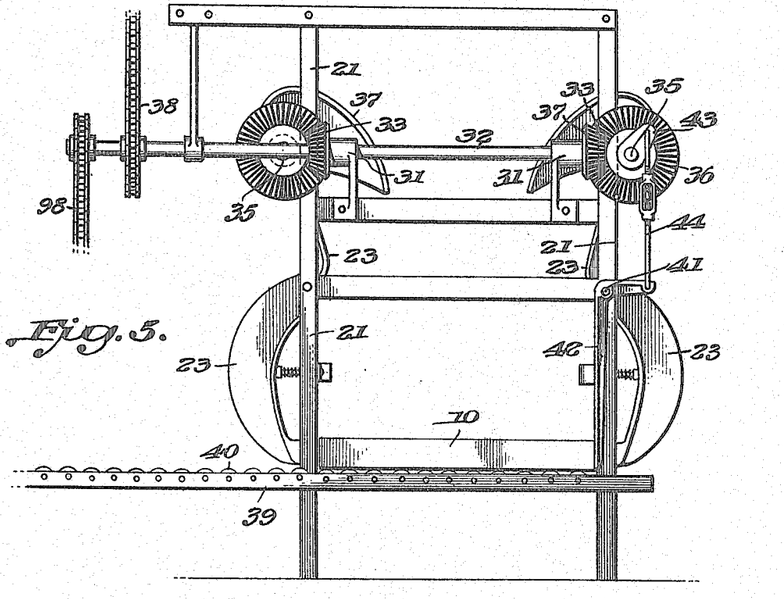
Fig. 5 is a front elevation looking toward the striking or jarring mechanism, showing a modified means for removing the filled molds after they have been struck.

If, however, it is desired to dump the molds by hand, the mechanism shown in Fig. 5, or that shown in Fig. 7 may be employed in lieu of the automatic mechanism shown at the left of the frame 21 in Figs. 1 and 2.

Referring to Fig. 5, a table 39, preferably inclined downwardly from its right hand end to its left hand end and provided with rollers 40, is arranged crosswise in front of the frame 21 in position to receive the mold 10 after it has been struck or rapped by the hammers 23 and has been pushed onto said rollers 40 by the action of the pusher 12.

Pivoted to the frame 21 at 41 is a bell crank pusher 42 which is arranged so that its lower end will lie alongside of the mold 10 when the latter is pushed out onto the table 39. A crank 43 connected to the horizontal arm of the bell crank pusher 42 by an adjustable connecting rod 44 affords means for operating the pusher 42. The pusher 42 gives a sufficient push or impulse to the mold 10 to start it down the conveyor 39 and as the latter is inclined and provided with rollers 40 for supporting the mold, the latter travels to one side of the machine and is then handled by attendants who apply the pallet to the mold and then dump the molded brick, after which the empty mold is taken to the sander.

In Fig. 7 a platform 39 and rollers 40 similar in construction, position, and purpose to those appearing in Fig. 5, are employed. In lieu of the pusher 42 there is provided the sprocket chain 45 running around sprockets 46 which are suitably mounted at 47, the right hand sprocket being driven by a sprocket chain 48 from sprocket wheel 49 carried by shaft 35. The sprocket chain 45 is provided with a pusher lug 50 which acts similarly to the action of the pusher 42 to start the mold 10 along the rollers 40 to get it out of the way of the succeeding mold.

Figure 3:
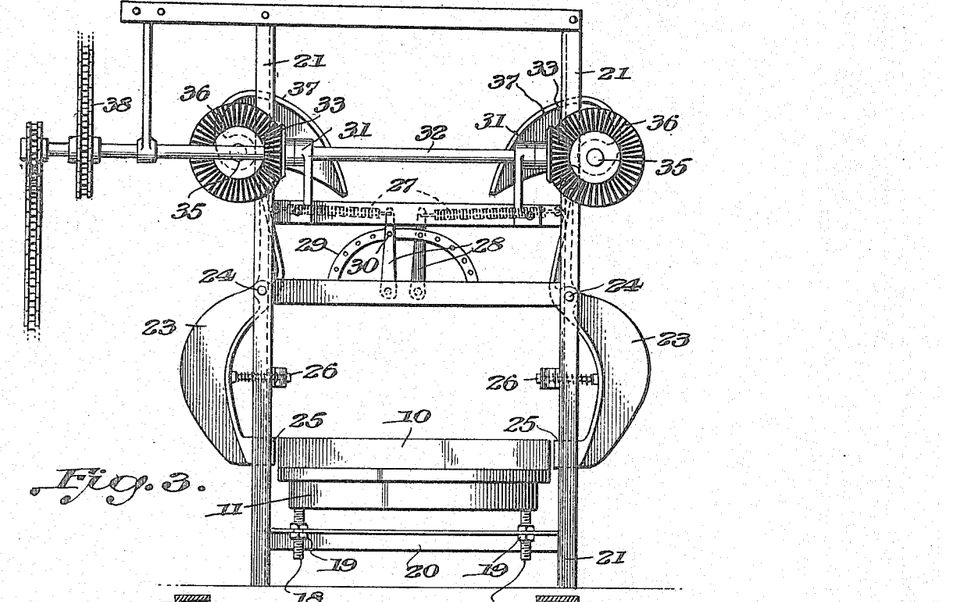
Fig. 3 is an enlarged front elevation showing the striking or jarring mechanism, a filled mold being shown in position on the table of the press in position to be struck.

From the foregoing explanation of the take off means of Figs. 5 and 7 and the description of the automatic take off means of Figs. 1 and 2, now to be described, it will be understood that the rapping or striking mechanism shown in Fig. 3 may be used in connection with any take off means for the molds and, in fact, the molds might be taken off directly by attendants, without the use of any take off mechanism, after they have been struck or rapped by the mechanism of Fig. 3.

Referring to Figs. 1, 2, 4 and 9, when the molds 10 as they travel along the guides 22, reach a suitable point, the attendants place on each mold a pallet 51.

Figure 9:
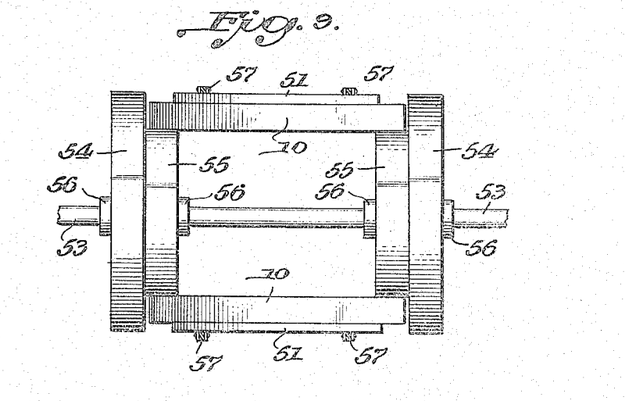
Fig. 9 is a front elevation, the chains being in section, showing the drum of the machines of Figs. 1, 2 and 8, two filled molds being shown in position to illustrate how they are inverted by passing around the drum.

There is provided an upright frame 52 in which is journaled the shaft 53 of a skeleton drum whose construction is best shown in Fig. 9. The drum has circular heads 54 each provided with an inner flange or a part of reduced diameter 55. Suitable collars 56 secure the drums against displacement. The molds 10 rest against the smaller parts or flanges 55 of the drum as they travel around the drum. Originally the pallets 51 are uppermost as shown at the top of Fig. 9 but the rotation of the drum brings them undermost as shown at the bottom of Fig. 9 whereupon the mold is arranged in inverted position, the brick within the mold being supported by the pallet 51 which is then ready for the action of the mechanism which lowers the pallet and mold.

For feeding the molds 10, one after another, to the drum and for holding the pallets and molds securely while the molds are traveling around the drum, there are provided flexible running grippers such as sprocket chains 57 which bear against the pallets 51 and hold the molds against the heads 55, the heads 54 then preventing lateral displacement of the molds.

The sprocket chains 57 travel around sprocket wheels 58 suitably journaled in frame 52 at 59 and around lower sprocket wheels 60 suitably journaled in bearings on frame 52 at 61.

Rockers 62 which are rockably mounted in bearings 63, carry a shaft 64 on which the sprocket wheels 65 are suitably mounted between collars 66. The chains 57 run around the sprocket 65. Means are provided for applying tension to the rockers 62 for the purpose of keeping the chains 57 sufficiently taut to cause them to bind the molds 10 against the drum to insure against slippage of the molds as they travel around the drum. For that purpose there is provided weights 67 of which one is shown in Fig. 1, suspended from cables 68 connected to the rockers 62 and running over sheaves 69, on a shaft 70 which is carried by uprights 71.

Figure 4:
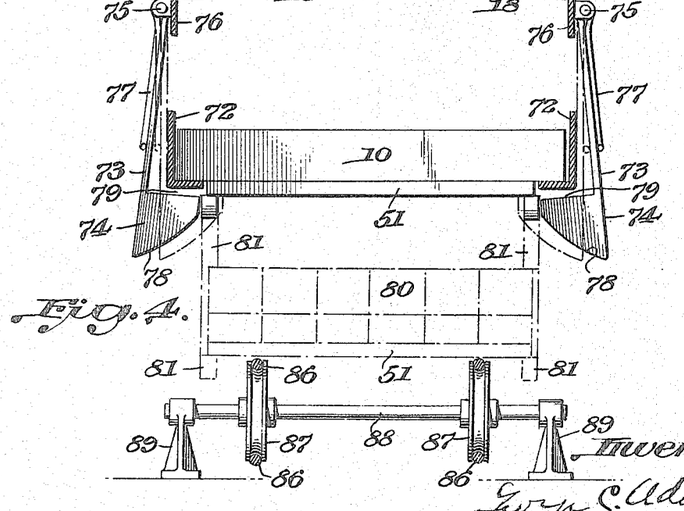
Fig. 4 is an enlarged elevation, partly in section, showing the mechanism which handles the mold, pallet, and molded brick for the purpose of lowering away and carrying off the pallet and brick while supporting the next filled mold.

The mechanism previously described causes the inversion of the molds and as they are delivered from the drum, they slide onto horizontal ways or skids 72, Figs. 1 and 4; the pallets 51 being narrower than the molds 10, they do not engage the ways 72 and hence are free to be lowered away from the molds as shown in Fig. 4.

To retain the pallet on a mold which is awaiting the lowering away of the pallet and bricks thereover while a preceding mold is being lowered, means is provided which may assume the construction shown in Figs. 1 and 4, comprising supports 73 which have heads 74 of sufficient width to properly engage under the pallet 51 as shown by dotted lines in Fig. 4 for the purpose of sustaining the pallet and bricks. The supports 73 are rockably hung at 75 from suitable frame pieces 76 and they are actuated by springs 77 to cause them to normally move toward each other to the dotted line position of Fig. 4. The lower surfaces of the heads 74 are inclined or rounded at 78 but their upper faces 79 are squared or flat so that they will properly engage the pallet 51.

For the purpose of lowering away the pallet 51 and the molded brick 80 shown by dotted lines in Fig. 4, there is provided a downwardly rocking fork or pair of arms 81 carried by the rockable shaft 82, said shaft having an arm 83 which is connected by an adjustable rod 84 to an arm 85 carried by shaft 13.

The arms 81 form a cradle, said arms being adapted to engage the rounded or inclined surfaces 78 and then to engage the pallet 51 so that when the arms descend, the pallet 51 and molded brick 80 are lowered away or drawn from the mold 10. Immediately the arms 81 have cleared the heads 78, the springs 77 position the heads 74 so that they will be ready to receive and support the pallet and mold following the one which has been drawn.

Located below the ways 72 is a suitable conveyor arranged to receive the pallet and brick as shown by dotted lines in Fig. 1. This conveyor may consist of cables 86 running around sheaves 87 on a shaft 88 mounted in bearings 89. Any suitable means, not shown, may be employed for driving the cables. The descent of the arms 81 brings their ends below the plane of the upper stretches of the cables 86 and the arms being then in inclined position as shown by dotted lines in Fig. 1, the travel of the upper stretches of the cables 86 toward the left, Fig. 1, draws the pallet and brick off of the arms 81. Thus, the pallets and the brick carried thereby are carried off to any suitable point as illustrated in Fig. 1.

Figure 8:
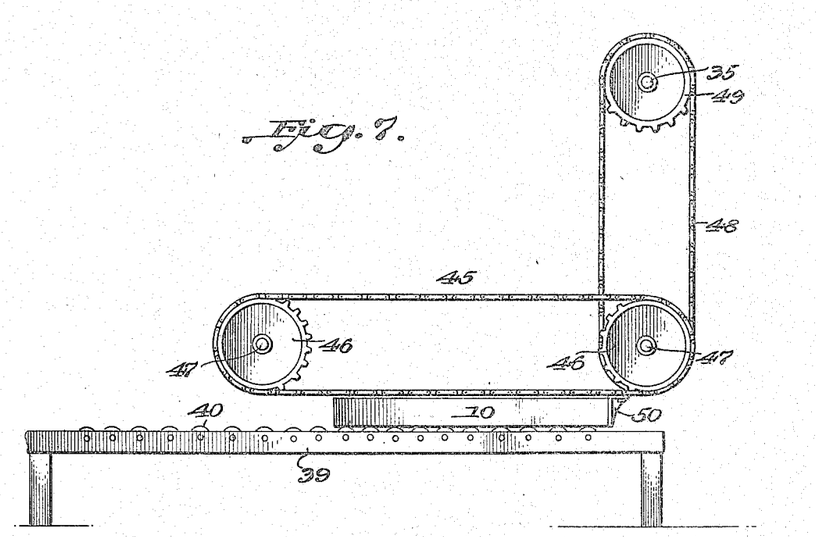
Fig. 8 is a side elevation of a modification of the machine of Figs. 1 and 2 wherein improved means is provided for returning the empty molds to the brick press.

The molds 10 are pushed in a step by step manner along the ways 72 and the mechanism for handling them may be either that shown in Figs. 1, 2 and 6, or, the modified construction shown in Fig. 8, according to whether it is desired to "sand" the molds automatically, or, to deliver them directly to the press.

Referring first to Figs. 1, 2 and 6, the molds eventually pass onto ways 90 which are provided with suitable side walls to prevent displacement of the molds. When the mold is on the ways 90, it is engaged by a pusher 91 carried by a sprocket chain 92 which travels at right angles to the ways 72 and runs over sprocket wheels 93 and 94, the former being suitably mounted as shown in Fig. 1 and the latter being carried by a shaft 95, Figs. 2 and 6, which is in mesh with shaft 96 through the medium of bevel gears 97, the shaft 96 being mounted in bearings 97' and connected by sprocket drive 98 to shaft 32.

Referring to Fig. 6, the mold having been pushed to the end of the ways 90, it is finally pushed onto other ways 99 arranged at right angles to the ways 90 and in position to be lifted by the turn-over forks 100 which are of general Y shape and are carried by the shaft 96, said forks revolving with the shaft 96 and the parts being so timed that the forks will be arranged to receive the mold at the proper time and to carry it over and restore it to its normal position with its top uppermost and deliver it to the ways 99 down which it will slide onto any suitable sanding apparatus shown at 101.

In Fig. 8 there is shown a modified delivery means for the inverted molds 10 which may be used instead of the delivery means shown in Figs. 1 and 2, previously described. In this modification, the molds 10 pass from the ways 72 onto parallel conveyor chains 102 which are operated from a shaft 103 connected by a sprocket chain 104 to the shaft 32. The chains 102 have pushers 102ª. The molds are carried along horizontally and then upwardly and then turned over so that they will be in proper position when delivered to the brick press and they are pushed under the box 2 by the pusher 12. The chains 102 run around upper sprockets 105 and lower sprockets 106 and there is provided an idler roller 107 which holds the mold onto the upper stretches of the sprocket chains as they turn from a horizontal to a vertical position. The molds are then guided by a guide 107ª until they are finally flopped onto the bed or table of the press.

I claim:

1. In a brick machine having a press provided with a projecting table for supporting molds, and jack screws for supporting the projecting part of the table.

2. In a brick machine, means for striking or rapping the molds comprising, gravity-actuated pendant swinging hammers adapted to strike the sides of the mold, and means for raising and releasing said hammers to permit them to fall by gravity to deliver their blows on the mold.

3. In a brick machine, means for striking or rapping the molds comprising, gravity-actuated pendant swinging hammers adapted to strike the sides of the mold, and cams for raising and releasing said hammers to permit them to fall by gravity to deliver their blows on the mold.

4. In a brick machine, means for striking or rapping the molds comprising, swinging hammers adapted to strike the sides of the molds, means for operating the hammers to cause them to deliver blows on the mold, and cushioning means for regulating the strength of the blows struck by the hammers.

5. In a brick machine, means for striking or rapping the molds comprising, gravity-actuated swinging hammers adapted to strike the sides of the mold, means for raising and releasing the hammers, and adjustable spring means cooperating with the hammers adapted to regulate their blows.

6. In a brick machine, means for striking or rapping the molds comprising, swinging hammers adapted to strike the sides of the mold, means for operating the hammers, and adjustable spring tensioning means for said hammers comprising coil springs connected to the hammers and adjustable levers to which said coil springs are connected, said levers having means adapted to lock them in different positions to vary the tension on the coil springs.

7. In a brick machine, means for striking or rapping the molds comprising, swinging hammers adapted to strike the sides of the mold, means for operating the hammers, and adjustable spring bumpers for regulating the blow struck by the hammers.

8. In a brick machine, means for striking or rapping the molds comprising pivoted hammers, cams adapted for swinging and releasing the hammers, spring bumpers for cushioning the blow of the hammers, and coil springs connected to the hammers and having an adjustable anchorage by which their tension may be varied at will.

9. In a brick machine, means for unloading the molds containing the brick, comprising means for bringing the molds and their pallets into inverted position, means for supporting the mold when in inverted position, shiftable means for engaging and supporting the pallet and the brick when the mold is in inverted position, and means for lowering away the pallet and brick from the mold, said means being adapted to disengage the pallet supporting means when operating to engage the pallet and permitting the pallet supporting means to return to supporting position to support the pallet on a succeeding mold when the pallet and brick of a preceding mold have been lowered.

10. In a brick machine, means for unloading the molds containing the brick, comprising means for bringing the molds and their pallets into an inverted position, means for supporting the mold when in inverted position, shiftable means for engaging and supporting the pallet and the brick when the mold is in inverted position, and a rocking cradle whose arms are adapted to engage the pallet for the purpose of lowering the pallet and the brick from the mold, said arms also engaging and shifting the pallet supporting means but releasing the pallet supporting means when the pallet and brick have been lowered, so that the pallet supporting means may return to normal position and be adapted to support the pallet and brick of a succeeding mold.

11. In a brick machine, means for unloading the molds containing the brick, comprising means for bringing the molds and their pallets into an inverted position, means for supporting the mold when in inverted position, spring-actuated swinging supports adapted to normally lie so that they will support the pallet of a mold when the mold is supported, and a rocking cradle having arms adapted to press aside the pallet supporting means and to engage the pallet and thereafter to rock downwardly to lower the pallet and the brick carried thereby, said spring-actuated pallet supporting means being then adapted to resume normal position for the purpose of supporting the pallet of a succeeding mold.

12. In a brick machine, means for unloading the molds containing the brick, comprising means for bringing the molds and their pallets into an inverted position, means for supporting the mold when in inverted position, spring-actuated swinging supports adapted to normally lie so that they will support the pallet of a mold when the mold is supported, a rocking cradle having arms adapted to press aside the pallet supporting means and to engage the pallet and thereafter to rock downwardly to lower the pallet and the brick carried thereby, said spring-actuated pallet supporting means being then adapted to resume normal position for the purpose of supporting the pallet of a succeeding mold, and a conveyor to which the cradle delivers the pallet and its load of brick when said cradle is in lowered position.

13. In a brick machine, the combination with a rotary drum, of endless chains arranged to grip the pallets and molds fed to said drum so that said pallets and molds will both be clamped directly against the surface of the drum and turned by it into inverted position to position the pallets and molds so that the pallets, and the bricks supported thereby, may be lowered away from the molds, and to permit removal of the molds after they are emptied, swinging arms carrying wheels over which said chains run, and cables and weights on said swinging arms to tension the chains so that they will properly clamp the pallets and molds to the drum.

In testimony whereof I affix my signature.

GEORGE C. ADAMS.